Aug. 21, 1951
K. T. FUEHRING
2,565,073
AUTOMATIC TIRE PRESSURE SWITCH
Filed Nov. 5, 1948
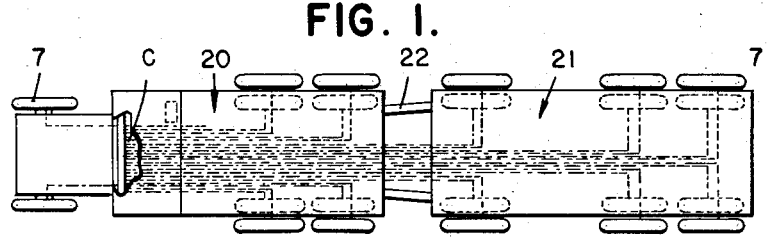
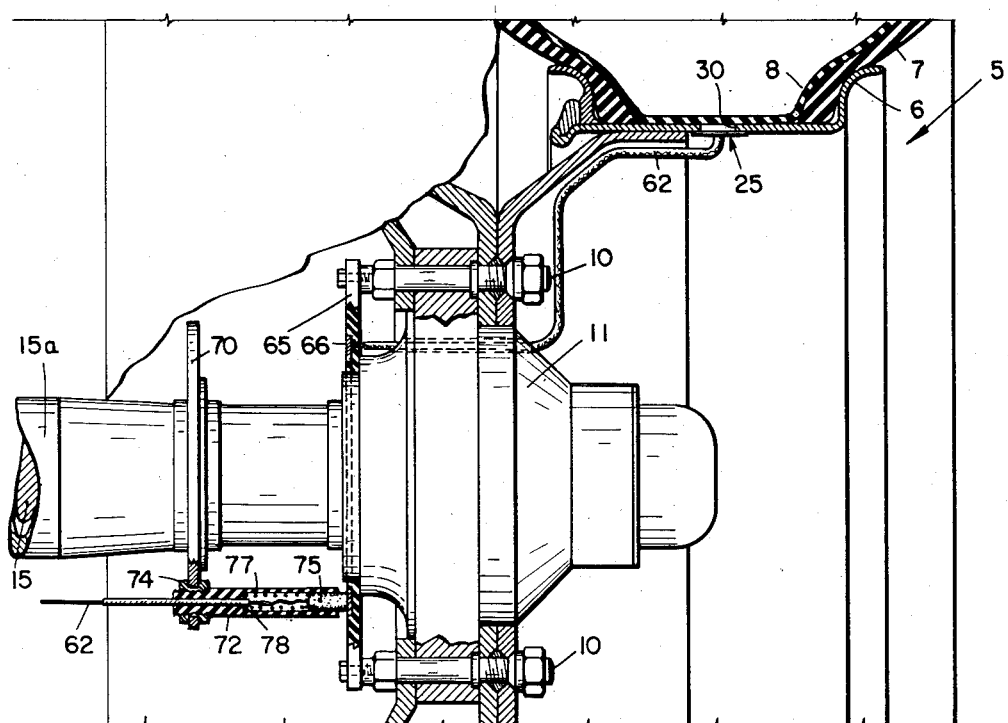
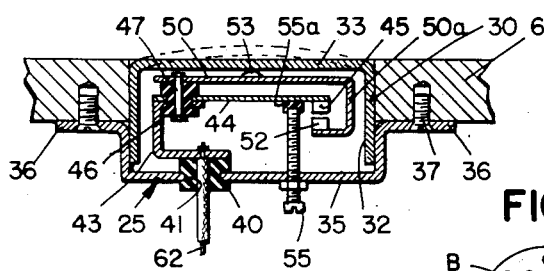
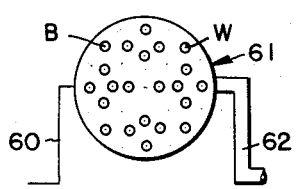
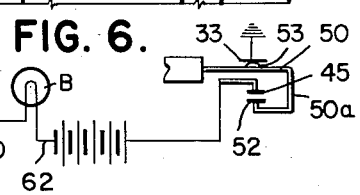
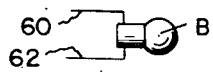
INVENTOR
KARL T. FUEHRING
BY
*Mason Graham*
ATTORNEYS Patented Aug. 21, 1951

2,565,073

UNITED STATES PATENT OFFICE 2,565,073

AUTOMATIC TIRE PRESSURE SWITCH

Karl T. Fuehring, Hollydale, Calif., assignor of one-half to Charles E. Moose, Los Angeles, Calif.

Application November 5, 1948, Serial No. 58,513

1 Claim. (Cl. 200—58)

This invention has to do with devices for automatically indicating, at a remote point, changes in pneumatic pressure in vehicle tires.

In heavy trucks and trailers, considerable damage results when a pneumatic tire becomes deflated or its pressure becomes dangerously low. In modern trucking, heavy trailers are towed and on each end of each axle a plurality of wheels carrying pneumatic tires are mounted. It is difficult for the driver of such a truck to keep fully and promptly informed of pressure changes in the various tires and as a result fires and other serious damage frequently result when one of the tires becomes deflated or so low in pressure as to contact a contiguous tire.

It is an object of this invention to overcome those dangers by providing a simple and effective pressure responsive device on each wheel rim and so electrically connecting each device to a signal element adjacent the driver's seat as to indicate to the driver instantly when a tire becomes low in pressure and also to indicate the precise tire that is low in pressure.

Another object is to provide an automatic signalling device of this character which operates in response to the pressure at which the tire constricts about the rim upon which it is mounted, which pressure of course varies with the air pressure in the tire.

Another object is to provide a signalling device of this character which is mounted in the rim and in such position that it may not be damaged.

Another feature of my invention is the novel means which I provide for electrically connecting the signalling element with the pressure responsive actuating element.

Further, subordinate objects will become obvious from the following detailed description of one of the presently preferred embodiments of the invention, for which purpose I shall refer to the accompanying drawing, in which:

Fig. 1 is a plan view of a truck and trailer arrangement utilizing my signalling system;

Fig. 2 is an enlarged sectional view, with some parts shown in elevation, illustrating my pressure responsive actuating element installed on a vehicle wheel;

Fig. 3 is an enlarged sectional view illustrating the pressure responsive actuating element of my device;

Fig. 4 is an elevational view of the signalling element;

Fig. 5 is an elevational view of one of the members of the signalling element; and Fig. 6 is a diagram of the electrical circuit.

It will be understood, of course, that the invention, in its broader aspects as defined by the accompanying claim, is susceptible of various modifications.

Referring now to the drawings, I show at 5 a conventional vehicle wheel having the usual rim 6 mounting a pneumatic tire 7 and inner tube 8. The wheel is mounted by the conventional bolts 10 upon a hub 11, the hub being fixed on an axle 15 disposed in an axle housing 15a. In Fig. 1 I show a truck 20 towing a trailer 21 by the usual coupling 22, both the truck and trailer mounting a plurality of such tire and wheel units.

For mounting my pressure responsive actuating elements, generally denoted 25, I provide a hole 30 in each rim, in which hole I mount a casing 32 having a diaphragmatic top wall 33 exposed to contact by the tire. In the broader sense of my invention the diaphragmatic wall 33 may be looked upon as an integral part of the rim. The wall 33 is presprung to flex upwardly as viewed in Fig. 3. The open bottom of the casing 32 is closed by a yoke 35 having attaching flanges 36 secured to the rim as by screws 37.

An insulator 40 is mounted in an opening 41 in the yoke and mounts an electrically conductive bracket 43 carrying a resilient electrically conductive arm 44 mounting a contact element 45 at its free end. Fixed at one end to the bracket 43, as by a bolt 47, and extending through an insulator 46, there is a second resilient electrically conductive arm 50 having a hooked free end 50a mounting at its extremity a contact element 52 opposite contact 45 for circuit closing engagement therewith, as will be hereinafter described. The top of arm 50 has a boss 53 which is always in engagement with the undersurface of the wall 33, being maintained in such engagement by the resiliency of said arm. As a consequence, when the diaphragmatic wall 33 flexes upwardly, the arm 50 follows the diaphragm and also flexes upwardly to bring the contact 52 into circuit closing engagement with contact 45.

To adjustably hold the contact elements normally separated, I provide a set screw 55 threaded through the yoke and engaging the arm 44, the screw carrying an arm engaging member 55a made of rubber or other insulating material. By adjusting this set screw the sensitivity of the device may be adjusted.

As is usually the case, the rim 6 is electrically connected to the ground leg of the electrical circuit of the vehicle.

Positioned at a remote point, such as in the driver's compartment C, I mount an indicating device consisting of a box 61 containing a plurality of electric bulbs B exposed through a window W in the front of the box. One leg 60 of the battery circuit of the vehicle is always connected to each of the individual bulbs, while from each pressure responsive actuating element 25 another wire 62 extends to a bulb, there being a wire 62 leading from the bracket 42 of each of the respective elements 25 to each of the respective bulbs. Thus, when the air pressure in any tire 7 becomes low enough to permit the diaphragmatic wall 33 to flex upwardly sufficiently to permit the flexible arm 50 to flex upwardly to bring contact 52 into circuit closing engagement with contact 45, the circuit to the bulb corresponding to that particular wheel will be closed and the bulb will be illuminated, indicating to the driver the particular tire that is deflated or low in pressure.

While various means may be employed to transmit the electrical current from the respective elements 25 to the respective bulbs of the signalling or indicating device, I provide means which I find to be particularly efficient and which I shall now describe.

On the hub of each wheel I mount a ring 65, secured to the hub as by the bolts 10, so as to rotate with the wheel, and each of the rings 65 carries a contact ring 66 to which the outer end of a wire 62 is connected, the other end of each wire 62 extending through the insulator 41 and being connected to a bracket 43.

A second ring 70 is fixed on the axle housing 15a so as to be stationary therewith. A sleeve 72 extends through an opening in the ring 70 and is held in position by a retaining nut 74. In the outer end of the sleeve I slidably mount a carbon brush 75 which is urged into contact with the contact ring 66 by a coil spring 77, the spring bearing at its inner end against an annular shoulder 78 provided by the relatively larger and smaller diameter portions of the bore in the sleeve. The wire 62 continues from the brush, through the sleeve and thence to the box 61 where it is connected to one of the bulbs B.

It will be observed that my device functions in response to the constrictive pressure of the tire about the rim—that is, the greater the air pressure in a tire the greater the pressure at which it constricts about the rim. This enables me completely to house the signal actuating elements in a casing so that they are not exposed to dust or the elements, and there are no lateral protuberances to engage obstructions. If a user desires the signalling element to be actuated at a relatively small pressure reduction, it is only necessary to adjust the set screw 55 outwardly to the desired extent to bring the contact points closer towards each other.

While I have described my device and system as applied to a vehicle such as a heavy truck and trailer, it will be apparent that it is also adaptable for use in any vehicle using pneumatic tires. For instance, in heavy airplanes it is important to maintain the air pressure in the tires on the landing wheels equal, or at least that the pilot know in advance of landing which tire or tires may be low in pressure so that he may compensate for the pressure differentials in landing the plane. My device will provide the pilot with such information.

Also, while I have described the signalling element as an electric bulb, it will be understood of course that any other instrumentality may be substituted, such as an electric bell or even a sound film, or even a combination of audible and visible signalling means. In fact, in an extremely simple structure, it may suffice to mount some signalling element, such as an electric buzzer or bell, upon the vehicle wheel itself and actuate it by my pressure responsive actuating element.

I claim:

A device for signalling air pressure changes in a pneumatic tire, comprising, in combination with a tire-carrying rim having an opening through its peripheral portion, a closed casing having: a side wall fitting in said opening, a diaphragmatic top wall disposed normally flush with the outer surface of said rim but being so pre-stressed that its center portion flexes outwardly when such flexure is unopposed by air pressure in said tire, and a detachable bottom cover; and circuit breaking means within the casing, including a first contact element supported by and insulated from said bottom cover and a resilient second contact element supported by and normally insulated from said first contact element; said second contact element having resilient engagement with said top wall and being flexible in response to flexure of said top wall.

KARL T. FUEHRING.

REFERENCES CITED

The following references are of record in the file of this patent:

UNITED STATES PATENTS

| Number | Name | Date |
| --- | --- | --- |
| 1,769,427 | Garside | July 1, 1930 |
| 2,179,255 | Edmonston | Nov. 7, 1939 |
| 2,195,155 | Spurlock | Mar. 26, 1940 |
| 2,205,163 | Guthrie | June 18, 1940 |
| 2,347,541 | Critser et al. | Apr. 25, 1944 |
| 2,429,024 | Jones | Oct. 14, 1947 |